United States Patent [19]

Zulian et al.

[11] Patent Number: 5,060,188
[45] Date of Patent: Oct. 22, 1991

[54] SYSTEM USING REGISTERS FOR MAINTAINING DATA ADDRESS AND CLASS INFORMATION FROM PREVIOUS MODULE ACCESSES FOR PREDICTIVE MEMORY MODULE SELECTION

[76] Inventors: Ferruccio Zulian, Via G.B. Vico 12, 20010 Cornaredo (MI), Italy; Enrico Porro, Via S. Anna 17, 20010 Bareggio (MI), Italy

[21] Appl. No.: 316,068

[22] Filed: Feb. 27, 1989

[30] Foreign Application Priority Data

Mar. 15, 1988 [IT] Italy ................................ 19773 A/88

[51] Int. Cl.⁵ ...................... G06F 15/18; G06F 13/14; G06F 12/06; G06F 9/355

[52] U.S. Cl. .................................. 364/900; 364/243; 364/259.6; 364/259; 364/238.4; 364/239; 364/246.3; 364/247; 364/247.2; 364/273.1; 364/274; 364/276.2; 364/276.9; 364/926.1; 364/948.4; 364/926.2; 364/927.92; 364/927.97; 364/933; 364/933.2; 364/939; 364/940.71; 364/940; 364/942.8; 364/947; 364/947.2; 364/948.8

[58] Field of Search ... 364/200 MS File, 900 MS File

[56] References Cited

U.S. PATENT DOCUMENTS

| | | |
|---|---|---|
| 4,042,913 | 8/1977 | Birney .................................. 364/200 |
| 4,156,905 | 5/1979 | Fassbender ........................ 364/900 |
| 4,280,176 | 7/1981 | Tan ...................................... 364/200 |
| 4,296,467 | 10/1981 | Nibby ................................ 364/200 |
| 4,323,965 | 4/1982 | Johnson ............................. 364/200 |
| 4,344,131 | 8/1982 | Girard ................................ 364/200 |
| 4,384,342 | 5/1983 | Imura ................................. 364/900 |
| 4,408,273 | 10/1983 | Plow ................................. 364/200 |
| 4,531,200 | 7/1985 | Whitley ............................. 364/900 |
| 4,592,011 | 5/1986 | Mantellina ........................ 364/900 |
| 4,800,489 | 1/1989 | Moyer .............................. 364/200 |
| 4,809,156 | 2/1989 | Taber ................................ 364/200 |
| 4,821,185 | 4/1989 | Esposito .......................... 364/200 |
| 4,831,522 | 5/1989 | Henderson ....................... 364/200 |
| 4,860,252 | 8/1989 | Sykora ............................. 364/900 |
| 4,932,001 | 6/1990 | Chow ............................... 365/203 |
| 4,961,172 | 10/1990 | Shubat ........................... 365/233.5 |

Primary Examiner—Archie E. Williams, Jr.
Assistant Examiner—Eric Coleman
Attorney, Agent, or Firm—J. S. Solakian; J. H. Phillips

[57] ABSTRACT

A memory system includes a plurality of memory modules, wherein the selection of one among the memory modules is performed in preselection as to the memory activation for a memory access operation on the basis of the previously performed selection of the same module for a preceding memory access operation and wherein, in case the performed preselection is not the appropriate one, the appropriate selection is first performed and then the memory access operation is "retried".

2 Claims, 2 Drawing Sheets

SYSTEM USING REGISTERS FOR MAINTAINING DATA ADDRESS AND CLASS INFORMATION FROM PREVIOUS MODULE ACCESSES FOR PREDICTIVE MEMORY MODULE SELECTION

FIELD OF THE INVENTION

The present invention relates to a computer system and, more particularly, to a computer memory subsystem having predictive module selection capability.

BACKGROUND OF THE INVENTION

It is known that semiconductor working memories, such as those used in data processing systems, are built up with a plurality of memory modules to incrementally increase their capacity. For such memories the problem of a fast and efficacious module selection arise; i.e., the selection operation implies a time waste which, if at all possible, must be avoided.

Conceptually a memory address, expressed in binary code, comprises a first bit field which references an addressable location or "entry" in each of a plurality of modules and a second bit field which references one among the several modules which form the memory. This second field must be decoded by a decoding circuit to provide a selection signal of one module, with exclusion of the others.

The time loss resulting from this decoding operation is made worse in systems where virtual memory addressing is used and the memories are structured for the immediate addressing of "rows" and the subsequent addressing of "columns". In these systems the address generated by a processor requiring a memory operation is of logical type and comprises an "offset" field and a logical page address field. The "offset" field coincides with a corresponding "offset" field of the physical address, but the logical page address field must be converted for its use in a physical page address. This conversion is typically performed by an address management unit or MMU.

When this address structure is used, it is possible to immediately start a memory operation by providing the memory system with the "offset" field, and subsequently forwarding the physical page address. The physical page address substantially comprises a field corresponding to a column address and a field which identifies a module (which module field must be decoded).

In order to avoid time losses involved in decoding and further, in case of logical addresses, due to the delay in the availability of the field to be decoded, the prior art approaches have employed the simultaneous activation of all the memory modules, the selection being performed at the output level by enabling the output of the selected module only. This enabling operation may be performed at the end of the memory cycle, when the address information required for selection is already available.

This prior art approach, however effective, has heavy trade offs. The activation of all memory modules results in substantial power consumption and thus requires power supplies sized for the maximum foreseen memory capacity. Further, if write operations of the "off line" type are performed, (i.e. the write operation, once started, is completed by the memory system without any form of control by the processor), it becomes impossible to exert a timely control on the operation result.

Still further, the write operation may reference an entry which exceeds the installed memory capacity. (In fact, it is clear that the presence or absence of a selected memory module may be verified only when the logical address has been converted into a physical address and only when the physical address has been decoded to produce a module selection signal, with circuits and methods an example of which is provided by U.S. Pat. No. 4,592,011.) The resulting "overmemory" signal becomes available too late for consideration. Thus, either the protection is given up or the off line write operations are given up or complex expedients have to be provided.

The present memory subsystem with predictive module selection of the present invention overcomes these drawbacks of prior art memory subsystems employing a plurality of addressable modules.

OBJECTS OF THE INVENTION

It is therefore a broad object of this invention to provide an improved memory selection scheme in a computer system.

It is a more specific object of this invention to provide a memory selection scheme with predictive module selection in order to increase the speed of memory access without significant trade offs in other operational aspects.

SUMMARY OF THE INVENTION

Briefly, these and other objects of the invention are achieved by a scheme based on the fact that the physical memory addressing, for each of differing categories of information (instructions, data) and for each of differing operations (read, write), is mostly sequential and the fact that, even in case of branches, the information follows a prevailing locality criterion in its allocation within the memory space. Therefore, if for a certain operation the selection of a predetermined module is required, it is very likely that the following operation of the same type will require the selection of the same memory module. Thus the module selection may be based on the previously occurred module selection signal, latched in a suitable register, without waiting for the completion of decoding operations.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENTS

Figure 1:
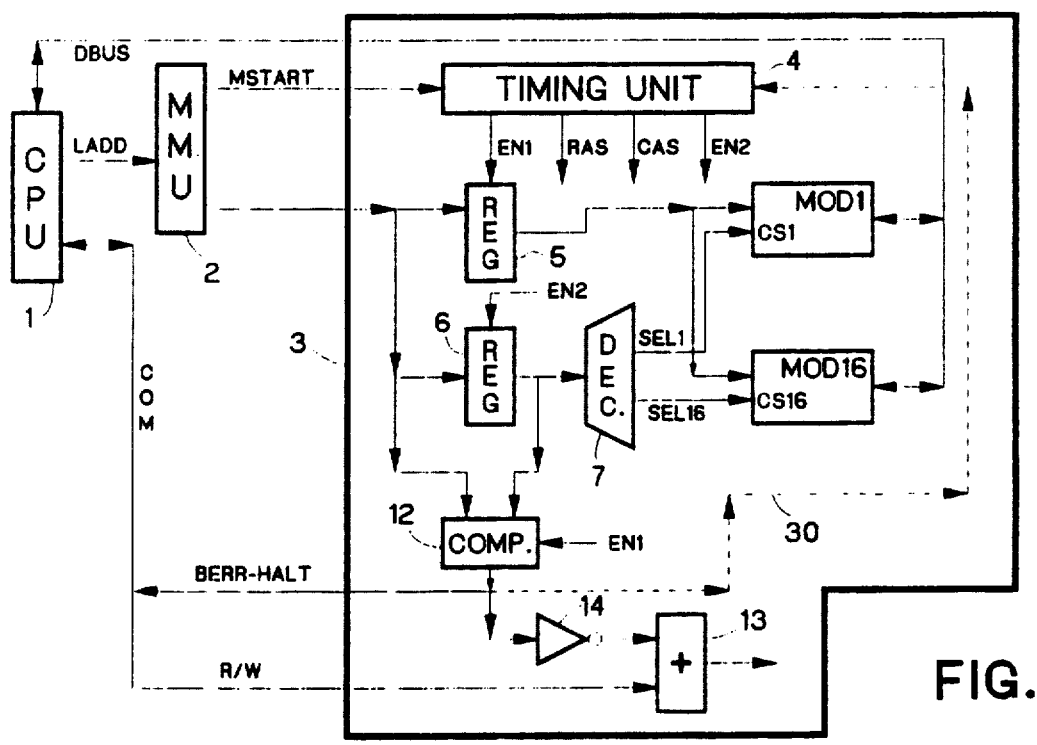
FIG. 1 is a block diagram of a first simplified embodiment of the memory system of the invention.

Referring now to FIG. 1, there is shown in block diagram a first embodiment of the invention in the context of a data processing system. The system incorporates a central processing unit CPU 1, for instance a microprocessor 68020 of the United States firm Motorola, a memory address management unit MMU2 and a working memory 3 having parallelism of four bytes (double word). Working memory 3 includes a plurality of banks or modules, up to a maximum, for instance, of sixteen modules (respectively referenced as MOD1 ... MOD16), a timing unit 4 and interface registers 5, 6.

CPU 1 communicates with the working memory 3 and with other system units, such as coprocessors and input/output units, through a system bus having an address channel LADD, a control channel COM and a bidirectional data channel DBUS. To perform a memory access operation (or an access to other system units), CPU 1 places a logical address LA0-31 on the address channel. The logical address is received by MMU 2 and converted thereby to a physical address PADD.

Together with the physical address, MMU2 produces a signal MSTART for selection and activation of the memory (if the memory is the destination unit).

The physical address PADD is expressed by a certain number of bits PAD0-25, of which bits of weight 0-1 indicates the position of the requested information (byte) within a double word and bits having weight from 2 to 25 are effectively used for memory addressing. The assumption is made that each of the memory modules has a capacity, expressed in addressable locations, of one megalocations, each location being defined by a column address of ten bits and by a row address of ten bits. The address bits PAD2-21 identify a location within each module, and the four address bits PAD22-25 identify one among the sixteen possible modules.

Thus, memory 3 receives signal MSTART and the address bits PAD2-25, and signal MSTART activates the timing unit 4, which generates a suitable sequence of control signals EN1, RAS, CAS, EN2. Register 5 is loaded by signal EN1 with address bits PAD 2-21, which are forwarded, as row address (bits PAD2-11) and column address (bits PAD12-12) to all the memory modules. Register 6 is loaded by signal EN2, at the end of a memory cycle, with address bits PAD22-25. The outputs of latching register 6 are connected to the inputs of a decoder 7 which generates as its output, in a mutually exclusive way, one of sixteen selection signals SEL1, ... SEL16, each of which selects a corresponding memory module.

By selection, it is meant both the enabling of a module, if such module is composed of integrated circuits having a CE (chip enable) control input, and the selective application of signals RAS, CAS, controlled by the selection signals through suitable logic gates. By way of example, FIG. 1 shows that module MOD1 is controlled by signal SEL1 input to control input CE1 and module MOD16 is controlled by signal SEL16 input to control input CE16.

The data inputs/outputs of the several modules, of tristate type in the example, are enabled only if the corresponding module is active and are all connected to the data channel DBUS. Signal R/W, issued by CPU1 on control channel COM and received by memory 3 defines the data transfer direction.

Working memory 3 further includes a comparator 12 having a first input set connected to the inputs of latching register 6 and a second input set connected to the outputs of latching register 6. Comparator 12 is enabled by signal EN1 which causes the loading of register 5.

The operation of the memory subsystem is very simple. The first time the memory is activated, the contents of latching register 6 are random or, if an initialization reset had been provided, are all zeroes. As a consequence a module is randomly selected even before a memory cycle is activated. However, as soon as the memory cycle starts (by enabling comparator 12), it is possible to verify if the module to be selected is the one already selected or a differing one. If the module is the same, the memory operation is successfully and normally concluded. If, however, the module is a differing one, comparator 12 issues an error/stop signal (BERR-HALT) at level 0, and this signal is forwarded to CPU 1.

In response to such signal, CPU 1 performs a "retry" operation; i.e., it controls a repeating of the previous operation. In practice, it maintains on address channel LADD the previous address such that the address PADD and control signal MSTART are maintained unchanged at the output of MMU2. Meanwhile, at the end of the first memory cycle, signal EN2 caused the loading of latching register 6 with the appropriate module selection code. As a consequence, the appropriate memory module is now selected, and the next following memory operation can be successfully concluded.

The module preselection enables to recover all the delays intrinsic to the selection logic and ultimately enables an increase in the operating speed of the memory. It is clear that as long as the memory addresses are in a field which selects the same module, all the memory access operations are successfully performed without he need to "retry" them. It is only in case the memory access requires the selection of a module differing from the one previously used that a "retry" operation is required.

Suitable protection circuits are provided to avoid a condition in which a write operation, performed in a module other than the appropriate one, may alter the contents of a memory location. For this purpose, signal R/W issued by CPU 1, received by memory 3 and defining, when at level 0, a write operation, is transferred to the several modules through an OR gate 13. OR gate 13 receives, at a second input, the output signal from comparator 12 and passed through an inverter 14. Thus, if there is an unsuccessful comparison, the write command R/W=0 is converted into a read command R/W=1, and the location erroneously selected is not changed.

Since at each memory operation, one and only one module is selected, the power consumption of the memory 3 is greatly reduced if compared with the prior art memories where, in order to increase the operative speed, all the memory modules are concurrently activated. Further such reduced consumption is substantially independent of the number of modules, which may be increased at will, without impact on the powering devices.

Figure 2:
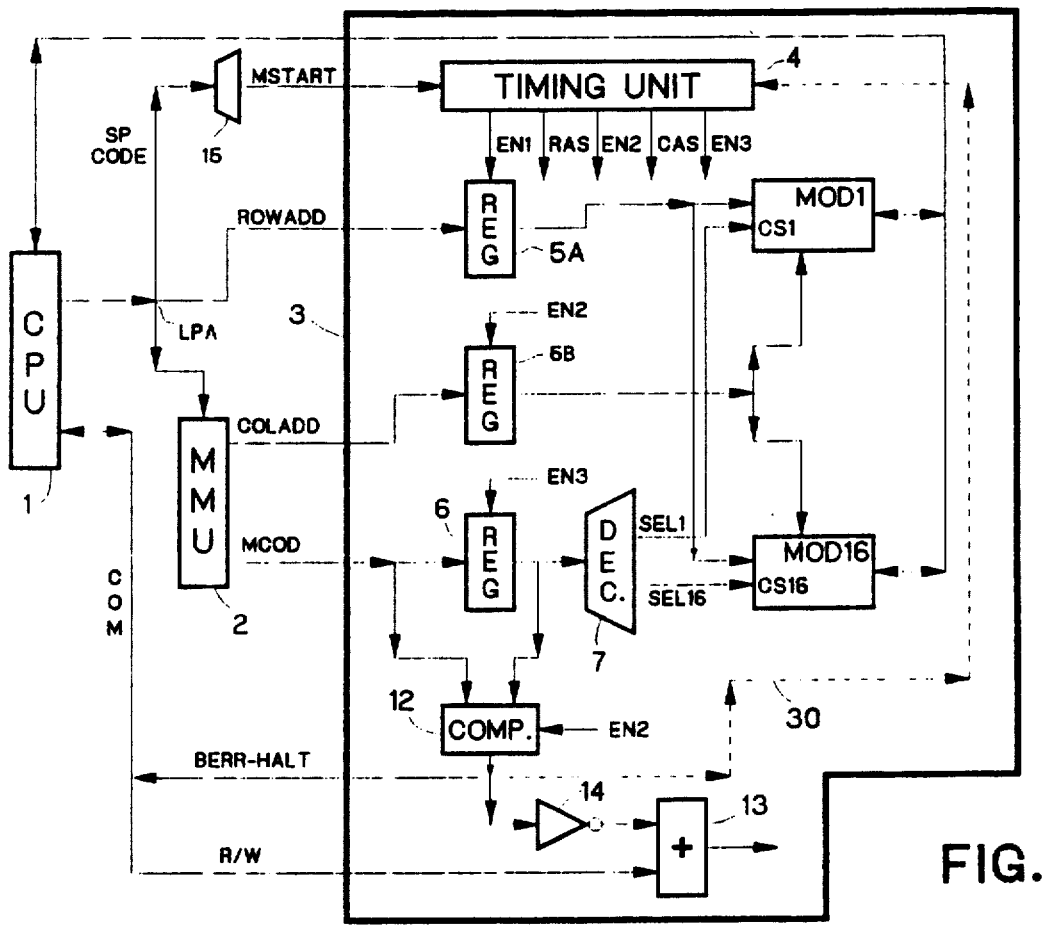
FIG. 2 is a block diagram of a second simplified embodiment of the memory system of the invention.

Attention is now directed to FIG. 2 which shows an embodiment, similar to that shown in FIG. 1, in which the advantages of the invention are further enhanced. The embodiment of FIG. 2 differs from that of FIG. 1 only by the fact that the memory activation is advanced with respect to effective availability of the physical addresses.

In this case, CPU 1 generates a logical address having three parts: an "Offset" which coincides with a portion of the physical address and may be used as a row address ROWADD for the several memory modules; a space code SPCODE which defines if the addressed space is a memory space or a space of some other resource (register space, peripheral unit space and so on); and a page code LPA which, subject to conversion in a physical page address by the MMU2, may be used in part as a column address COLADD and in part as a module selection code MCOD.

The space code SPCODE is applied to a decoder 15 which issues resource selection commands and, among them, signal MSTART. Timing unit 4, on receipt of MSTART generates a sequence of control signals EN1, RAS, EN2, CAS, EN3. Control signal EN1 is used to load the row address (offset) already present as logical address, in a register 5A. Control signal EN2 is used to load column address COLADD, output from MMU2, in a register 5B. Control signal EN3, at the end of the memory cycle, is used to load the module selection code, output from MMU2, into latching register 6. Control signal EN2 is further used to enable comparator 12.

In the system of FIG. 2, the memory activation is controlled as soon as the logical address is available, the module preselection being determined by the code previously loaded in latching register 6. This results in a further reduction of the delay occurring between the instant at which CPU 1 requires a memory access operation and the completion of the same operation. Apart from this consideration, the system of FIG. 2 operates the same way as the one of FIG. 1.

Figure 3:
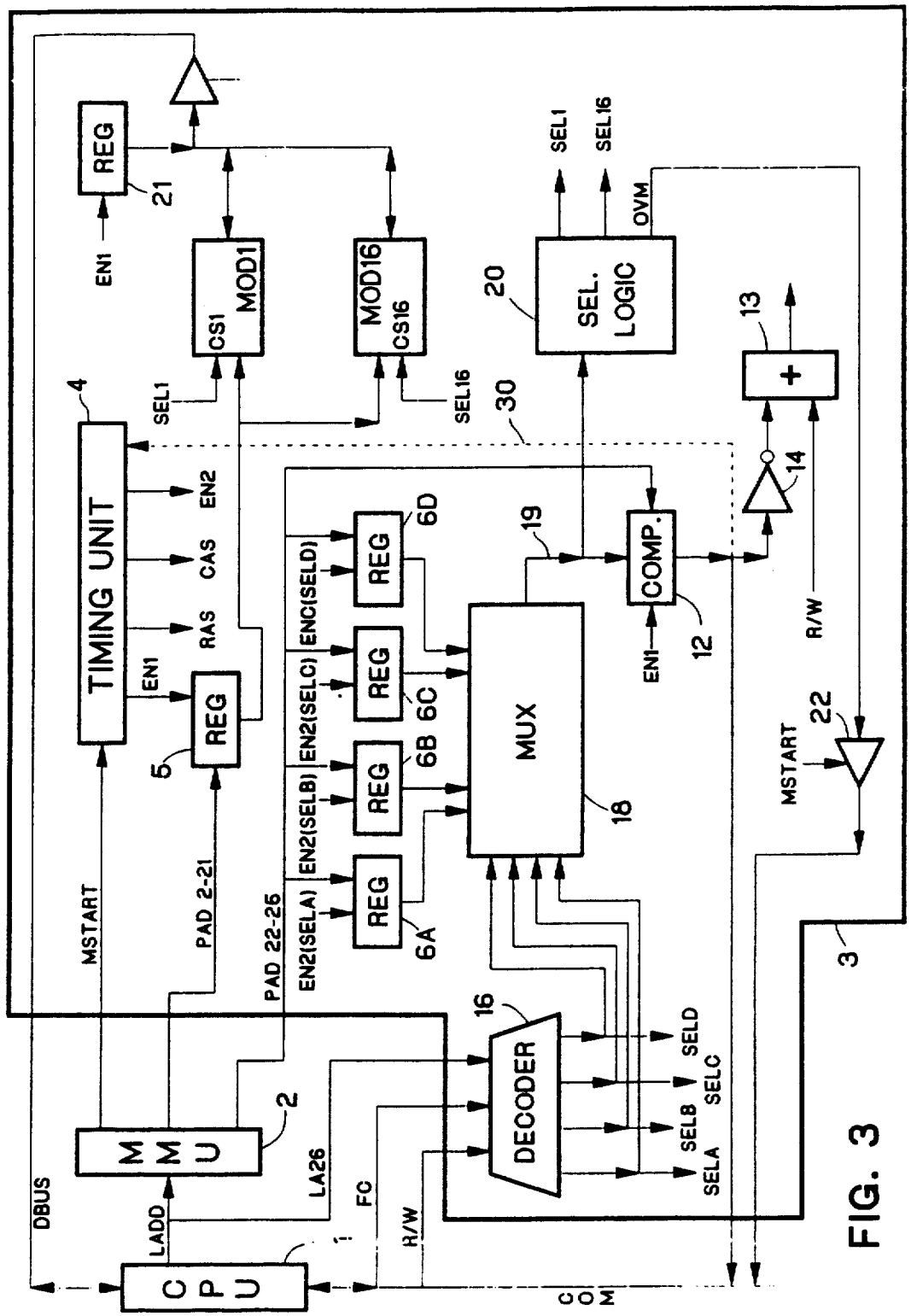
FIG. 3 is a block diagram of a presently preferred embodiment of the memory system of the invention.

FIG. 3 shows a system incorporating a further improvement to the system of FIG. 1 (and by analogy to the system of FIG. 2).

It is know that the memory addressing, in view of the manner in which information is organized, separately follows the sequentiality and locality criteria for data and instructions, and further in case of data, separately for data which may be defined as global and data which may be defined as local or stack data. A further distinction can be made for write operations as opposed to read operations.

Therefore, in order to reduce to a minimum the "retry" operations which may result from the circumstance that in the execution of a process an instruction read operation may be followed by a data read operation (the instruction and the data being stored in differing modules), latching register 6 of FIG. 1 is replicated in a plurality of registers 6A, . . . 6D, each devoted to store a module selection code specific to operation type or nature of the requested information. Thus, CPU 1 provides MMU with a logical address, and MMU2 issues a physical address PADD and a control signal MSTART which is forwarded to the timing unit 4.

Timing unit 4 generates the sequence of control signals EN1, RAS, CAS, EN2. The address bits PAD2-21 are loaded into register 5 by control signals EN1, and the address bits PAD22-25 (the module selection code) are loaded, owing to control signal EN2, into one of the plurality of registers 6A, 6B, 6C, 6D. Selection of one of registers 6A, 6B, 6C, 6D is performed as follows: among the several control signals generated by CPU 1, a function code FC is generated, which for sake of simplicity may be considered as a single bit. When FC=1, the information requested in a read operation is an instruction; alternatively, when FC=0, the requested information is data. In case of a write operation, the information to be written is always considered as data.

The logical address bit LA26, the most significant bit of the logical address (bits LA27-31 constitute a field which identifies the system space and, within such space, memory 3 as one of the destinations), characterizes data as global data if at logical level 0 and as local or stack data if at logical level 1. This distinction, however arbitrary, is in practice used for classifying and organizing data into two classes.

Signals FC, LA26 and R/W are applied to a decoding network 16 which issues one of four signals SELA, SELB, SELC, SELD, respectively having the following meanings:

SELA: instruction read operation
SELB: global data read operation
SELC: write operation
SELD: stack data read operation.

Each of these signals, in logical AND with signal EN2, enables the loading of one among registers 6A, 6B, 6C, 6D. These signals, further applied to the control inputs of a multiplexer 18 (or a functionally equivalent logical circuit), enable the selective and mutually exclusive connection of one of the register 6A, 6B, 6C, 6D to a common collector 19.

Comparator 12, enabled by signal EN1, receives at an input set the selection code present on collector 19 and, at another input set, the selection code in output from MMU2. The selection code present on collector 19 is further applied to a selection logic circuit 20, which decodes it in a module selection signal SEL1, . . . SEL16.

The operation of the system of FIG. 3 is similar to the one of the system of FIG. 1. The only difference is that a memory access is performed by activation of a memory module on the basis, not of the immediately preceding memory module selection, but of the preceding module selection used for the same class of operation and information.

In FIG. 3, decoder 7 of FIG. 1 is substituted with a selection logic 20 to effect a further advantage of the invention. (The selection logic 20 may be, for instance, of the kind described in U.S. Pat. No. 4,571,676.) It provides, in addition to a module selection signal, also an "overmemory" signal OVM if the memory address exceeds the effectively installed or usable memory capacity.

In case of a memory write operation "off line", CPU 1 puts the logical address on the address channel and the data to be written on the data channel. This information is latched at the beginning of a memory cycle in address register 5 and data register 21, respectively. Once the memory cycle is started, the CPU 1 relinquishes the memory and starts the execution of internal operations. However, before this occurs, it is necessary to be sure that the write operation can be effectively and successfully concluded. Therefore, an "overmemory" signal must be generated, in case of "overmemory", in the shortest possible time.

From this aspect, the CPU 1 has very stringent requirements. For instance, if the CPU 1 is a 68020 microprocessor operating at a clock rate of 25 MHz, a memory write operation develops in the time span of six CPU states, S0, . . . S5 each having a duration of twenty nsec. During state S0, CPU 1 puts the logical address code on the address channel and the required control signals on the control channel. During state S2, the data code is put on data bus. (Address and control signal are stable at the beginning of state S1, and data is stable at the beginning of state S3.)

If the write operation cannot be performed because an overmemory occurs, CPU 1 must receive a BERR error signal not later than 10 ns prior to the end of state S4. On the other hand, the memory access may occur only after conversion of the logical address into a physical address by MMU2, and this conversion requires about fifty nsec. The memory activation, the generation of the MSTART signal, occurs roughly in the middle of state S3. Therefore only twenty nsec are available for checking the address, the detection of the overmemory occurrence and the generation of the error signal, and this time margin is critical.

By the adoption of the memory subsystem with predictive module selection of the invention, on the contrary, even the overmemory signal has a predictive nature and is generated by logic 20 on the basis of a previously used selection code. This code is made available by multiplexer 18 (even considering the propagation delay of decoder 16 and multiplexer 18) at a time which is roughly within state S1. Therefore, a broader time window is available to logic 20 for generation of the overmemory signal. The overmemory signal OVM is transferred to CPU 1 through logical gate 22, enabled by signal MSTART, and can be received within the required time limit.

In the preceding description, reference has been made to a memory system with predictive module selection, where, in case of wrong prediction a "retry" occur; i.e., the repetition of the memory operation is performed with the appropriate module selection. However, it is clear that, rather than performing a "retry", it is possible to perform a time lengthening of the memory cycle by providing a time unit 4 having modifiable timing as described, for instance, in U.S. Pat. No. 4,249,253. With this approach, once a memory cycle has been started by control signal MSTART, if in the course of the operation the comparator 12, enabled by signal EN1 (EN2 in FIG. 2) generates an error indication, this indication, sent to timing unit 4 through the path indicated by dotted line in FIGS. 1, 2, 3 and referenced as 30, may change the timing sequence of timing unit 4.

For instance, signal EN2 (EN3 in FIG. 2) may be generated in advance of signals RAS, CAS so as to load the updated physical address in latching register 6 and have available, through decoder 7 (or 20 in FIG. 3), the appropriate module selection signal. Alternatively, signals RAS, CAS may be suitably delayed.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A memory subsystem with predictive module selection for a memory which includes a plurality of memory modules, said memory subsystem performing a plurality of memory access operations including at least a previous memory access operation and a subsequent memory access operation, each said memory access operation having a beginning and an end and a related memory address having a memory address field, the selection of one of said memory modules for a memory access operation being performed by a module selection command obtained by decoding the memory address field related to a previous access operation, said memory subsystem comprising:

A) latching register means for storing the memory address field related to a previous memory access operation at the end of said previous access operation and until the end of another memory access operation subsequent to said current memory access operation, said latching register means having inputs for receiving a memory address field to be stored and outputs for issuing a stored memory address field.

B) a decoding network for generating said module selection command by decoding the memory address field which is stored in said latching register means and is related to a previous access operation, said decoding network having inputs and outputs;

C) means coupling said outputs of said latching register means to said inputs of said decoding network whereby said decoding network generates said module selection command at its said outputs during said memory access operation subsequent to said previous one;

D) a comparator having first inputs connected to the inputs of said latching register means and second inputs connected to the outputs of said latching register means for comparing said memory address field to be stored in said register means and related to said subsequent memory access operation with the memory address field stored in said register means and related to said previous memory access operation and for providing an error and invalidation signal in case of inequality;

E) said latching register means comprising a plurality of registers, each said register being devoted to the latching of a memory address field related to a predetermined class of information among a plurality of classes including at least a data information class and in instruction information class; and F) said memory subsystem further comprising selection means controlled by control signals indicative of one among said plurality of classes to select one among said registers at the beginning of said subsequent memory access operation to enable the selected one register to transfer the memory address field, stored therein and related to a previous memory access operation and to the same one among said plurality of classes, to the inputs of said decoding network and to load said selected one register with the memory address field related to said subsequent memory access operation at the end of said subsequent memory access operation.

2. The memory subsystem of claim 1 further comprising logic means, enabled by said error signal, for converting a memory write operation into a memory read operation.

* * * * *